(12) United States Patent
Kaiser et al.

(10) Patent No.: US 8,860,275 B2
(45) Date of Patent: Oct. 14, 2014

(54) MULTI-LAYER ARC-SHAPED PERMANENT MAGNET MACHINE WITH REDUCED ROTATIONAL STRESS

(75) Inventors: Edward L. Kaiser, Orion, MI (US); Khwaja M. Rahman, Troy, MI (US); Sinisa Jurkovic, Sterling Heights, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 87 days.

(21) Appl. No.: 13/560,038

(22) Filed: Jul. 27, 2012

(65) Prior Publication Data

US 2013/0147303 A1    Jun. 13, 2013

Related U.S. Application Data

(60) Provisional application No. 61/568,884, filed on Dec. 9, 2011.

(51) Int. Cl.
*H02K 1/27* (2006.01)

(52) U.S. Cl.
USPC ............. 310/156.53; 310/156.56; 310/156.58

(58) Field of Classification Search
USPC ............. 310/156.53, 156.56, 156.01–156.84
See application file for complete search history.

(56) References Cited

U.S. PATENT DOCUMENTS

| | | | |
|---|---|---|---|
| 4,924,130 A * | 5/1990 | Fratta | 310/156.53 |
| 7,474,029 B2 | 1/2009 | Rahman et al. | |
| 7,847,461 B2 | 12/2010 | Rahman et al. | |
| 7,969,058 B2 | 6/2011 | Rahman et al. | |
| 2003/0102755 A1* | 6/2003 | Naito et al. | 310/156.39 |
| 2005/0140236 A1* | 6/2005 | Jeong et al. | 310/156.53 |
| 2009/0140592 A1 | 6/2009 | Rahman et al. | |
| 2009/0140593 A1 | 6/2009 | Kaiser et al. | |
| 2010/0141076 A1* | 6/2010 | Blissenbach et al. | 310/156.53 |
| 2010/0213781 A1 | 8/2010 | Rahman et al. | |
| 2011/0037339 A1 | 2/2011 | Rahman et al. | |

* cited by examiner

*Primary Examiner* — Tran Nguyen
*Assistant Examiner* — Leda Pham
(74) *Attorney, Agent, or Firm* — Quinn Law Group, PLLC

(57) ABSTRACT

An interior permanent magnet machine includes a rotor configured to magnetically interact with a stator. First and second dividers are integrally formed within the rotor and configured to create a first layer of three respective first segments. Each of the respective first segments may be substantially arc-shaped. A plurality of first magnets may be positioned in the first layer. The first magnets may be substantially arc-shaped and defined around an arc center. A third and a fourth divider may be integrally formed within the rotor and configured to create a second layer of three respective second segments. The placement of dividers or structural webs provides for increased rotational speed and reduced rotational stress compared to an undivided arc-shaped magnet configuration.

15 Claims, 3 Drawing Sheets

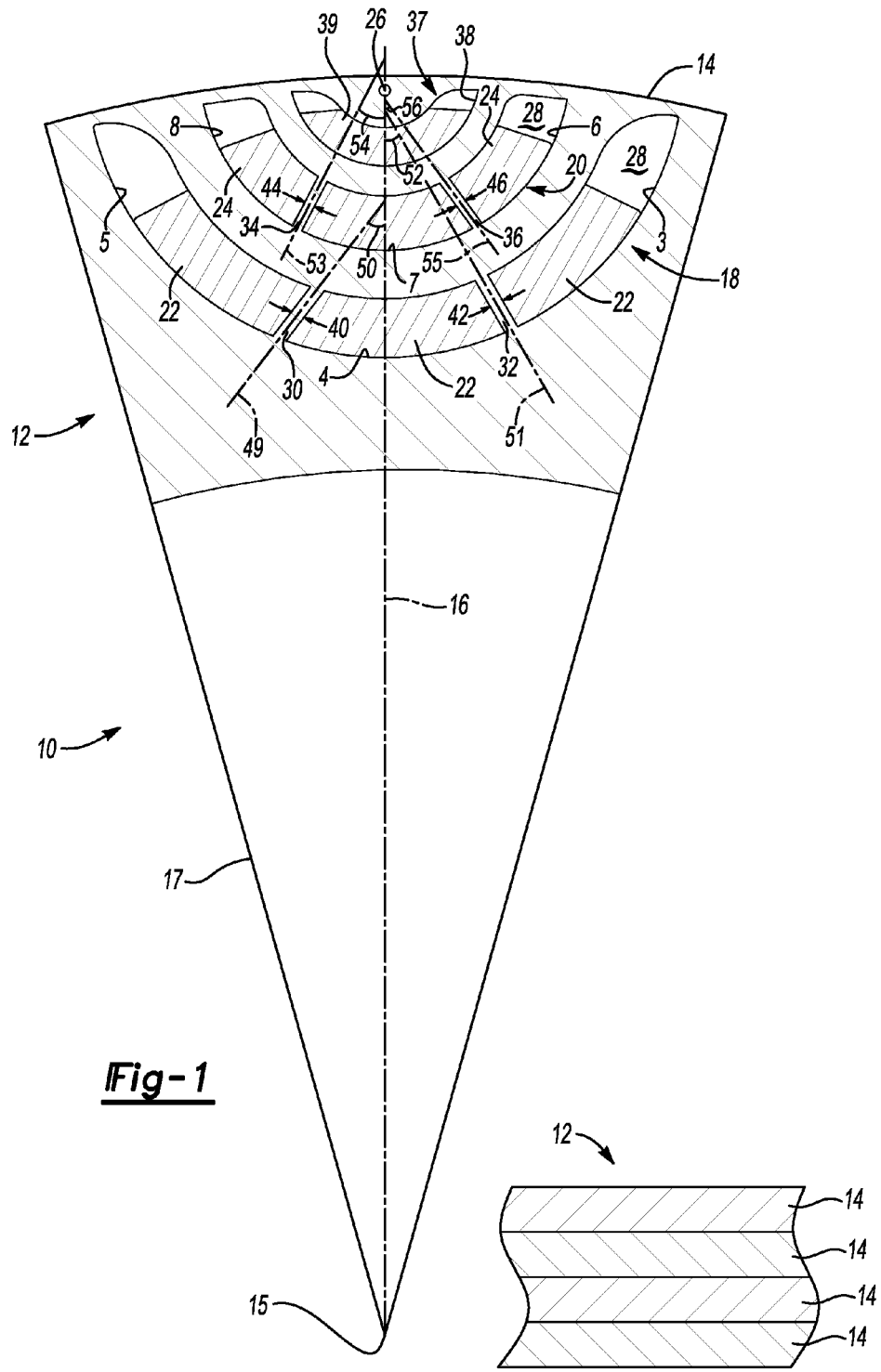

MULTI-LAYER ARC-SHAPED PERMANENT MAGNET MACHINE WITH REDUCED ROTATIONAL STRESS

CROSS-REFERENCE TO RELATED APPLICATIONS

This application claims the benefit of U.S. Provisional Patent Application No. 61/568,884 filed on Dec. 9, 2011, the disclosure of which is hereby incorporated by reference.

TECHNICAL FIELD

The present invention relates generally to an interior permanent magnet machine, and more particularly, to the configuration of the rotor in the interior permanent magnet machine.

BACKGROUND

An electric motor uses electric potential energy to produce mechanical energy through the interaction of magnetic fields and current-carrying conductors. The reverse process, using mechanical energy to produce electrical energy, is accomplished by a generator or dynamo. Other electric machines, such as motor/generators, combine various features of both motors and generators. An interior permanent magnet machine generally includes a rotor having a plurality of magnets of alternating polarity around the outer periphery of the rotor. The rotor is rotatable within a stator which generally includes a plurality of windings and magnetic poles of alternating polarity. The magnets used in interior permanent magnet machines are typically rectangular in shape.

SUMMARY

An interior permanent magnet machine includes a rotor configured to magnetically interact with a stator. First and second dividers are integrally formed within the rotor and configured to create a first layer of three respective first segments. Each of the respective first segments may be substantially arc-shaped. A plurality of first magnets may be positioned in the first layer. The first magnets may be substantially arc-shaped and defined around an arc center. The placement of dividers or structural webs provides for increased rotational speed and reduced rotational stress compared to an undivided arc-shaped magnet configuration. Additionally, the placement of dividers allows a multi-layer configuration of arc-shaped magnets to survive higher operating speeds with improved deflection.

In one embodiment, a third and a fourth divider may be integrally formed within the rotor and configured to create a second layer of three respective second segments. Each of the respective second segments may be substantially arc-shaped. A plurality of second magnets may be positioned within the second layer. The second magnets may be substantially arc-shaped and defined around an arc center.

Each of the first, second, third and fourth dividers define a respective angle that characterizes the slant or orientation of the respective divider. The first divider defines a first angle between a first centerline extending through the first divider and a center axis that extends through the arc center. The second divider defines a second angle between a second centerline extending through the second divider and the center axis. The third divider defines a third angle between a third centerline extending through the third divider and the center axis. The fourth divider defines a fourth angle between a fourth centerline extending through the fourth divider and the center axis. In one example, the first angle is the same as the second angle and the first angle is different from the third angle. In another example, each of the first, second, third and fourth angles are different from one another.

In a second embodiment, a fifth divider may be integrally formed within the rotor and configured to create a third layer of two respective third segments. A sixth divider may be integrally formed within the rotor and configured to create a fourth layer of two respective fourth segments. Various combinations of the first, second, third and fourth layers may be formed in single rotor.

The above features and advantages and other features and advantages of the present invention are readily apparent from the following detailed description of the best modes for carrying out the invention when taken in connection with the accompanying drawings.

BRIEF DESCRIPTION OF THE DRAWINGS

FIG. 1 is a schematic fragmentary cross-sectional view of an interior permanent magnet machine having a rotor, in accordance with a first embodiment;

FIG. 2 is a schematic fragmentary cross-sectional view of the rotor shown in FIG. 1;

DETAILED DESCRIPTION

Figure 3:
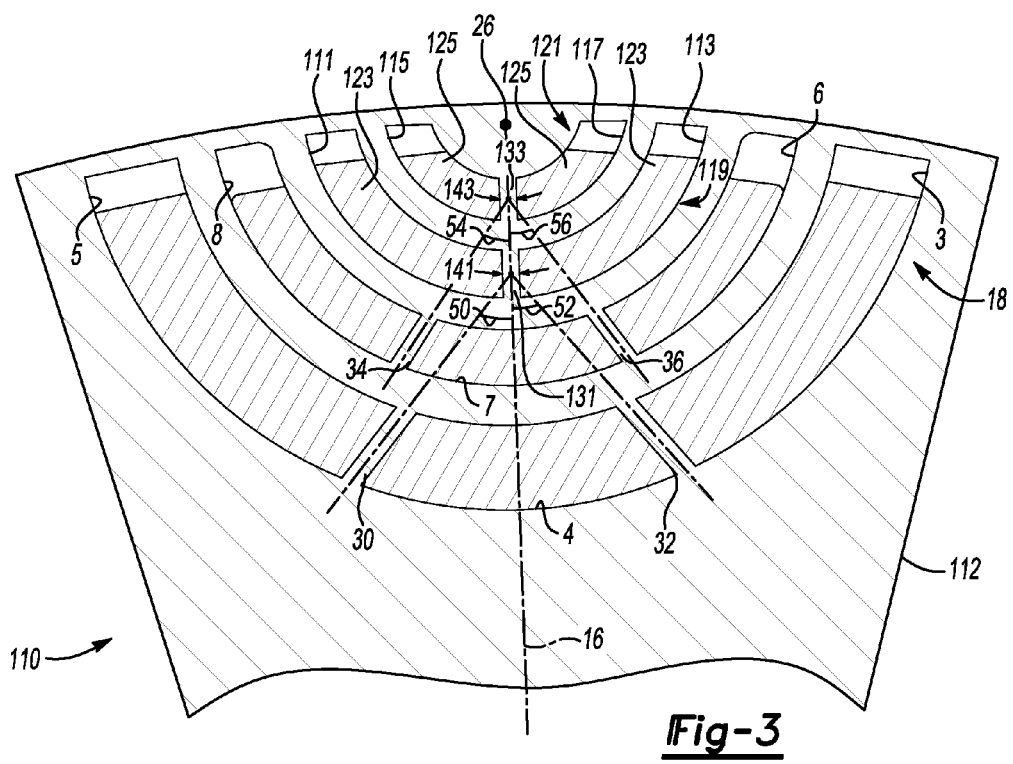
FIG. 3 is a schematic fragmentary cross-sectional view of a second embodiment of an interior permanent magnet machine.

Referring to the Figures, wherein like reference numbers refer to the same or similar components throughout the several views, FIG. 1 is a schematic cross-sectional view of a portion of an interior permanent magnet machine 10 having a rotor 12. The rotor 12 may be formed by stacking one or more laminations 14, also shown in FIG. 4. The laminations 14 are typically annularly-shaped. Referring to FIG. 1, each lamination 14 may surround a shaft 17 centered at an origin 15. For illustrative purposes, only a portion of the lamination 14 and shaft 17 are shown. The rotor 12 is rotatable within a generally annular stator (not shown).

Referring to FIG. 1, a first divider 30 and a second divider 32 are integrally formed within the rotor 12 and configured to create a first layer 18 of three respective first segments 3, 4, 5. Each of the segments described below are cavities that extend three-dimensionally into the rotor 12 (or rotor 112, 212, 312 and 412 in the embodiments described below). Each of the respective first segments 3, 4, 5 are substantially arc-shaped. A plurality of first magnets 22 may be positioned within the first layer 18, for example, one in each of the respective first segments 3, 4, 5. The first magnets 22 may be substantially arc-shaped and defined around a center axis 16 extending through an arc center 26. The rotor 12 may include air pockets 28 incorporated into the structure at various locations.

Similarly, third divider and a fourth divider 34, 36 are integrally formed within the rotor 12 and configured to create a second layer 20 of three respective second segments 6, 7, 8. Each of the respective second segments 6, 7, 8 are substantially arc-shaped. A plurality of second magnets 24 may be positioned within the second layer 20. The second magnets 24 may be substantially arc-shaped and defined around the arc center 26. Any number of dividers may be used within the first and second layers 18, 20.

Referring to FIG. 1, a third layer 37 is formed in the rotor 12 with a single third segment 38. An undivided or one-piece third magnet 39 may be positioned in the third layer 37. The dividers 30, 32, 34, 36 may be formed by stamping the laminations 14. The placement of dividers 30, 32, 34, 36 provides for increased rotational speed and reduced rotational stress compared to an undivided arc-shaped magnet configuration. The placement of dividers 30, 32, 34, 36 allows a multi-layer configuration of arc-shaped magnets to survive higher operating speeds with improved deflection.

Referring to FIG. 1, the first, second, third and fourth dividers 30, 32, 34, 36 may define first, second, third and fourth thicknesses 40, 42, 44, 46, respectively (measurable on a cross-sectional view). The rotor 12 may be configured such that the first thickness 40 is the same as the second thickness 42 but different from the third thickness 44. The fourth thickness 46 may be the same as the third thickness 44. By way of example only, the first, second, third and fourth thicknesses 40, 42, 44, 46 may be approximately 1.0 mm, 1.0 mm. 0.5 mm and 0.5 mm, respectively. The rotor 12 may be configured such that each of the four thicknesses 40, 42, 44, 46 are different. By way of example only, the first, second, third and fourth thicknesses 40, 42, 44, 46 may be approximately 1.4 mm, 1.2 mm. 0.5 mm and 0.8 mm, respectively. Each divider 30, 32, 34, 36 may be evenly spaced along its length.

Referring to FIG. 3, a second embodiment of an interior permanent magnet machine 110 having a rotor 112 is shown. The machine 110 in FIG. 3 is similar to the machine 10 in FIG. 1, with like reference numbers referring to similar components. The embodiment shown in FIG. 3 includes additional layers or barriers as is described below.

Referring to FIGS. 1 and 3, each of the first, second, third and fourth dividers 30, 32, 34, 36 may define a respective angle that characterizes the slant or orientation of the respective divider. Referring to FIGS. 1 and 3, a first angle 50 is defined between a first centerline 49 (labeled in FIG. 1) extending through the first divider 30, and the center axis 16 that extends through the arc center 26. Second angle 52 is defined between a second centerline 51 (labeled in FIG. 1) extending through the second divider 32, and the center axis 16. Third angle 54 is defined between a third centerline 53 (labeled in FIG. 1) extending through the third divider 34, and the center axis 16. Fourth angle 56 is defined between a fourth centerline 55 (labeled in FIG. 1) extending through the fourth divider 36, and the center axis 16.

Referring to FIG. 1, in one embodiment each of the first, second, third and fourth angles 50, 52, 54, 56 are different from one another. By way of example only, the first, second, third and fourth angles 50, 52, 54, 56 may be approximately 40, 45, 50 and 55 degrees, respectively. Referring to FIG. 3, in another embodiment the configuration may be such that the first angle 50 is the same as the second angle 52; the third angle 54 is the same as the fourth angle 56; and the first angle 50 is different from the third angle 54. By way of example only, the first and second angles 50, 52 may be approximately 50 degrees and the third and fourth angles 54, 56 may be approximately 45 degrees. In another embodiment each of the first, second, third and fourth angles 50, 52, 54, 56 are the same.

Referring to FIG. 3, a fifth divider 131 is integrally formed within the rotor 12 and configured to create a third layer 119 of two respective third segments 111, 113. The third segments 111, 113 are substantially arc-shaped. A plurality of third magnets 123 may be positioned in the third layer 119. The third magnets 123 may be substantially arc-shaped and defined around the arc center 26.

Referring to FIG. 3, a sixth divider 133 is integrally formed within the rotor 112 and configured to create a fourth layer of two respective fourth segments 115, 117. The fourth segments 115, 117 are substantially arc-shaped. A plurality of fourth magnets 125 may be positioned within the fourth layer 121. The fourth magnets 125 may be substantially arc-shaped and defined around the arc center 26. As noted previously, the third and fourth segments 111, 113, 115, 117 are cavities that extend three-dimensionally into the rotor 112.

Referring to FIG. 3, the fifth and sixth dividers 131, 133 may define fifth and sixth thicknesses 141, 143, respectively. By way of example only, in one embodiment the first, second, third and fourth thicknesses 40, 42, 44, 46 (labeled in FIG. 1) may be approximately 1.4 mm, 1.4 mm, 1.2 mm, 1.2 mm while the fifth and sixth thicknesses 141, 143 may be approximately 1.0 mm and 0.8 mm, respectively. The angles and thicknesses may be optimized based on the specifics of the particular application using modeling methods and optimization techniques known to those skilled in the art.

Figure 4:
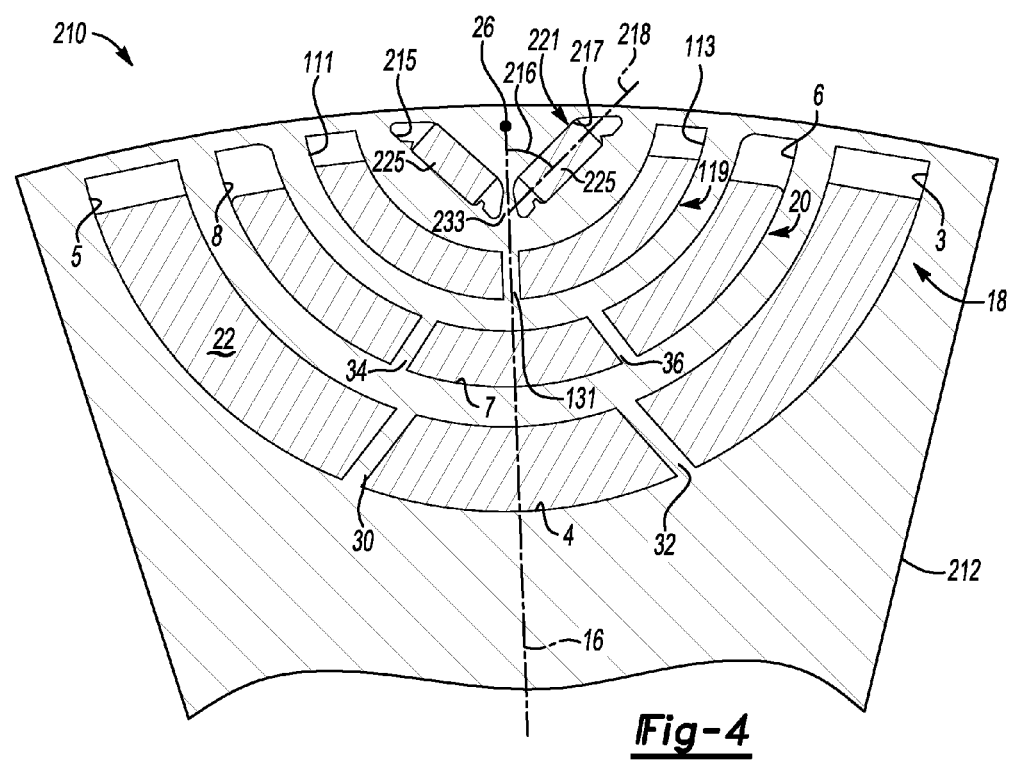
FIG. 4 is a schematic fragmentary cross-sectional view of a third embodiment of an interior permanent magnet machine.

Referring to FIG. 4, a third embodiment of an interior permanent magnet machine 210 having a rotor 212 is shown. The machine 210 in FIG. 4 is similar to the machine 110 in FIG. 3 in all respects except for differences in the fourth layers 121, 221 as described below, with like reference numbers referring to similar components.

Referring to FIG. 4, a sixth divider 233 is integrally formed within the rotor 212 and configured to create a fourth layer 221 of two respective fourth segments 215, 217. Unlike the embodiment shown in FIG. 3, the fourth segments 215, 217 are substantially rectangular-shaped. The fourth segments 215, 217 may be symmetric with respect to the axis 16. The fourth segments 215, 217 may be oriented at an angle 216 between the axis 16 and a centerline 218 through either of the fourth segments 215, 217, respectively. In one example, the angle 216 is approximately 45 degrees. A plurality of fourth magnets 225 may be positioned within the fourth layer 221. In other words, each of the segments 215, 217 in the fourth layer 221 may be at least partially filled with one or more fourth magnets 225. The fourth magnets 225 are substantially rectangular-shaped. A single rotor 112, 212 (shown in FIGS. 3-4) may include various combinations of substantially rectangular-shaped and substantially arc-shaped segments in each of the respective first, second, third and fourth layers 18, 20, 119, 121/221.

Figure 5:
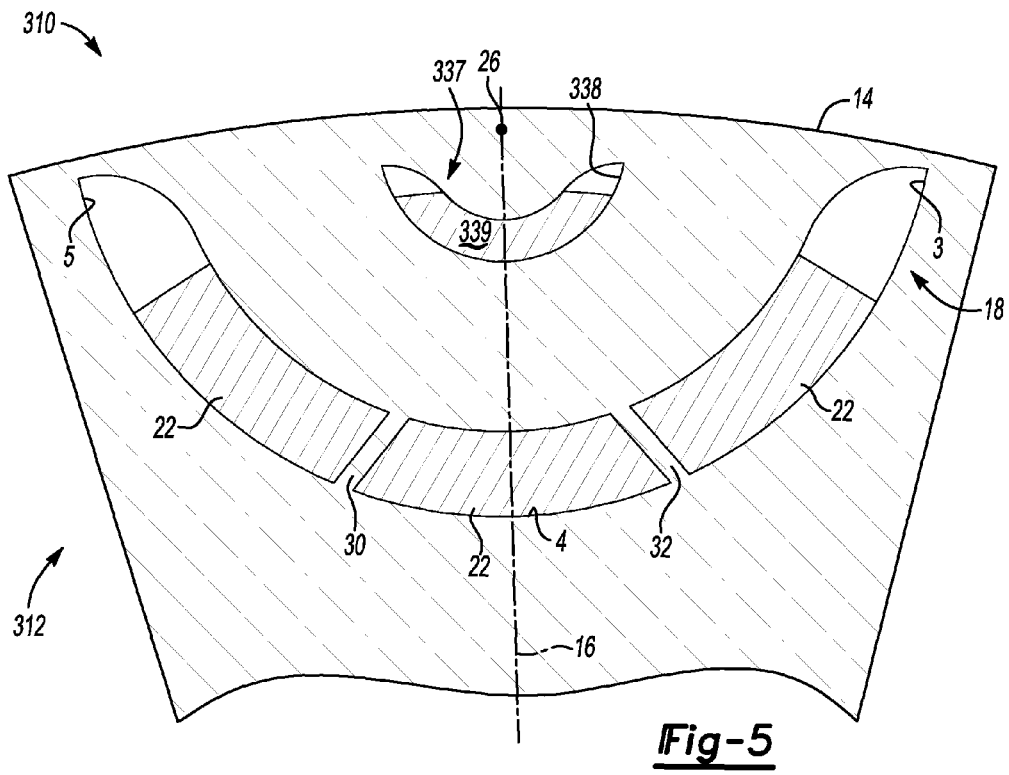
FIG. 5 is a schematic fragmentary cross-sectional view of a fourth embodiment of an interior permanent magnet machine.
Figure 6:
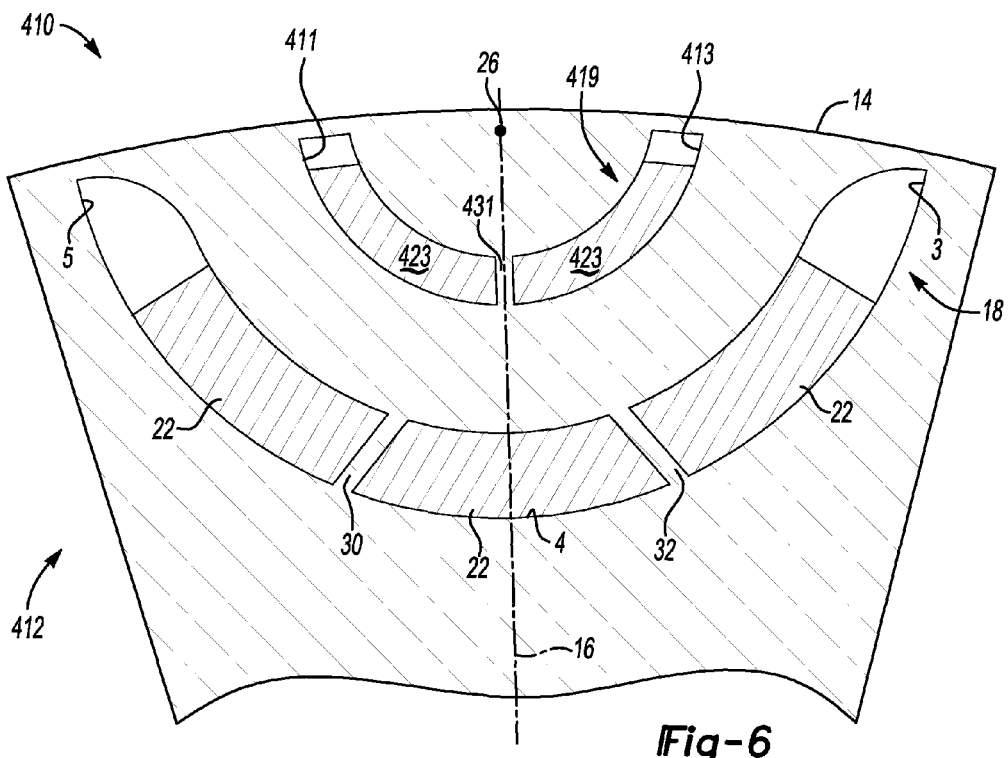
FIG. 6 is a schematic fragmentary cross-sectional view of a fifth embodiment of an interior permanent magnet machine.

Referring to FIG. 5, a fourth embodiment of an interior permanent magnet machine 310 having a rotor 312 is shown. Referring to FIG. 6, a fifth embodiment of an interior permanent magnet machine 410 having a rotor 412 is shown. Similar to the embodiments shown in FIGS. 1, 3 and 4, the machines 310, 410 in FIGS. 5, 6, respectively, include first and second dividers 30, 32 that are integrally formed within the rotor 12 and configured to create a first layer 18 of three respective first segments 3, 4, 5. As previously noted, like reference numbers refer to the same or similar components throughout the several views. As described in detail above, the dividers 30, 32 may be configured to define different angles and different thicknesses as previously described.

Referring to FIG. 5, the rotor 312 includes a second layer 337 with a substantially arc-shaped second segment 338. An undivided or one-piece second magnet 339 may be positioned in the second layer 337. The second magnet 339 may be substantially arc-shaped.

Referring to FIG. 6, a third divider 431 may be integrally formed within the rotor 412 and configured to create a second layer 419 of two respective second segments 411, 413. The second segments 411, 413 are substantially arc-shaped. A plurality of second magnets 423 may be positioned in the second layer 419. Each of the second magnets 423 may be substantially arc-shaped and defined around the arc center 26. The pattern or configuration shown in FIGS. 1 and 3-6 may be repeated for the entire rotor 12, 112, 212, 312, 412, respectively.

The detailed description and the drawings or figures are supportive and descriptive of the invention, but the scope of the invention is defined solely by the claims. While some of the best modes and other embodiments for carrying out the claimed invention have been described in detail, various alternative designs and embodiments exist for practicing the invention defined in the appended claims.

The invention claimed is:

1. An interior permanent magnet machine comprising:
   a rotor configured to magnetically interact with a stator;
   a first divider and a second divider integrally formed within the rotor and configured to create a first layer of three respective first segments, each of the respective first segments being substantially arc-shaped;
   a plurality of first magnets positioned within the first layer, the first magnets being substantially arc-shaped and defined around an arc center;
   a third divider and a fourth divider integrally formed within the rotor and configured to create a second layer of three respective second segments, each of the respective second segments being substantially arc-shaped;
   a plurality of second magnets positioned within the second layer, the second magnets being substantially arc-shaped;
   a first angle defined by the first divider between a first centerline extending through the first divider and a center axis extending through the arc center;
   a second angle defined by the second divider between a second centerline extending through the second divider and the center axis;
   a third angle defined by the third divider between a third centerline extending through the third divider and the center axis;
   a fourth angle defined by the fourth divider between a fourth centerline extending through the fourth divider and the center axis; and
   wherein the rotor is configured such that the first angle is the same as the second angle and the first angle is different from the third angle.

2. The machine of claim 1, further comprising:
   a second layer in the rotor having a second segment, the second segment being substantially arc-shaped; and
   a one-piece second magnet positioned in the second layer.

3. The machine of claim 1, further comprising:
   a third layer in the rotor having a third segment, the third segment being substantially arc-shaped; and
   a one-piece substantially third magnet positioned in the third segment.

4. The machine of claim 1, further comprising:
   first, second, third and fourth thicknesses defined by the first, second, third and fourth dividers, respectively;
   wherein the rotor is configured such that the first thickness is the same as the second thickness but different from the third thickness.

5. The machine of claim 1, further comprising:
   first, second, third and fourth thicknesses defined by the first, second, third and fourth dividers, respectively;
   wherein the rotor is configured such that each of the first, second, third and fourth thicknesses are different.

6. The machine of claim 1, wherein the first, second, third and fourth thicknesses are approximately 1.4 mm, 1.2 mm, 0.5 mm and 0.8 mm, respectively.

7. An interior permanent magnet machine comprising:
   a rotor configured to magnetically interact with a stator;
   first, second, third, fourth, fifth and sixth dividers integrally formed within the rotor;
   wherein the first and second dividers are configured to create a first layer of three respective first segments;
   wherein the third and fourth dividers are configured to create a second layer of three respective second segments;
   wherein the fifth divider is configured to create a third layer of two respective third segments;
   wherein the sixth divider is configured to create a fourth layer of two respective fourth segments;
   wherein each of the respective first, second, third and fourth segments are substantially arc-shaped;
   first, second, third, fourth, fifth and sixth thicknesses defined by the first, second, third, fourth, fifth and sixth dividers, respectively; and
   wherein the rotor is configured such that the first thickness is the same as the second thickness, the third thickness is the same as the fourth thickness and the first thickness is different from each of the third, fifth and sixth thicknesses.

8. The machine of claim 7, wherein the first and second dividers are approximately 1.4 mm thick, the third and fourth dividers are approximately 1.2 mm thick, the fifth divider is approximately 1.0 mm and the sixth divider is approximately 0.8 mm.

9. The machine of claim 7, further comprising:
   a first angle defined by the first divider between a first centerline extending through the first divider and a center axis extending through the arc center;
   a second angle defined by the second divider between a second centerline extending through the second divider and the center axis;
   a third angle defined by the third divider between a third centerline extending through the third divider and the center axis;
   a fourth angle defined by the fourth divider between a fourth centerline extending through the fourth divider and the center axis; and
   wherein the rotor is configured such that the first angle is the same as the second angle and the first angle is different from the third angle.

10. The machine of claim 9, wherein the fifth and sixth dividers are configured to be coincident relative to the center axis.

11. The machine of claim 7, further comprising:
   a first angle defined by the first divider between a first centerline extending through the first divider and a center axis extending through the arc center;
   a second angle defined by the second divider between a second centerline extending through the second divider and the center axis;
   a third angle defined by the third divider between a third centerline extending through the third divider and the center axis;
   a fourth angle defined by the fourth divider between a fourth centerline extending through the fourth divider and the center axis; and wherein the rotor is configured such that the first, second, third and fourth angles are each different from one another.

12. The machine of claim 11, wherein the fifth and sixth dividers are configured to be coincident relative to the center axis.

13. The machine of claim 7, further comprising:
a plurality of first, second, third and fourth magnets positioned within the first, second, third and fourth layers, respectively;
wherein each of the plurality of first, second, third and fourth magnets are substantially arc-shaped.

14. An interior permanent magnet machine comprising:
a rotor configured to magnetically interact with a stator;
a first divider and a second divider integrally formed within the rotor and configured to create a first layer of three respective first segments, each of the respective first segments being substantially arc-shaped;
a plurality of first magnets positioned within the first layer, the first magnets being substantially arc-shaped and defined around an arc center;
a third divider and a fourth divider integrally formed within the rotor and configured to create a second layer of three respective second segments, each of the respective second segments being substantially arc-shaped;
a plurality of second magnets positioned within the second layer, the second magnets being substantially arc-shaped;
first, second, third and fourth thicknesses defined by the first, second, third and fourth dividers, respectively; and
wherein the rotor is configured such that the first thickness is the same as the second thickness but different from the third thickness.

15. The machine of claim 14, further comprising:
a first angle defined by the first divider between a first centerline extending through the first divider and a center axis extending through the arc center;
a second angle defined by the second divider between a second centerline extending through the second divider and the center axis;
a third angle defined by the third divider between a third centerline extending through the third divider and the center axis;
a fourth angle defined by the fourth divider between a fourth centerline extending through the fourth divider and the center axis; and
wherein the rotor is configured such that the first, second, third and fourth angles are each different from one another.

\* \* \* \* \*